United States Patent Office 2,993,327
Patented July 25, 1961

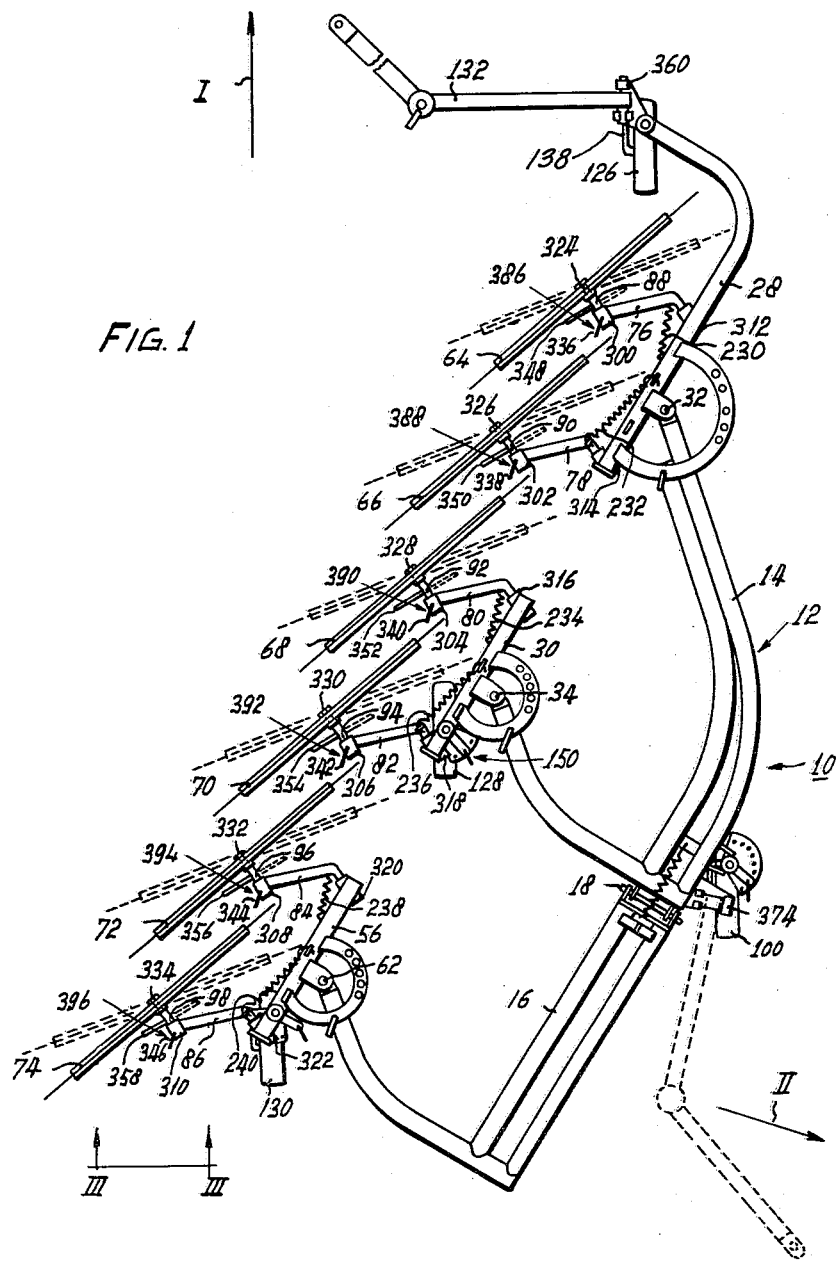

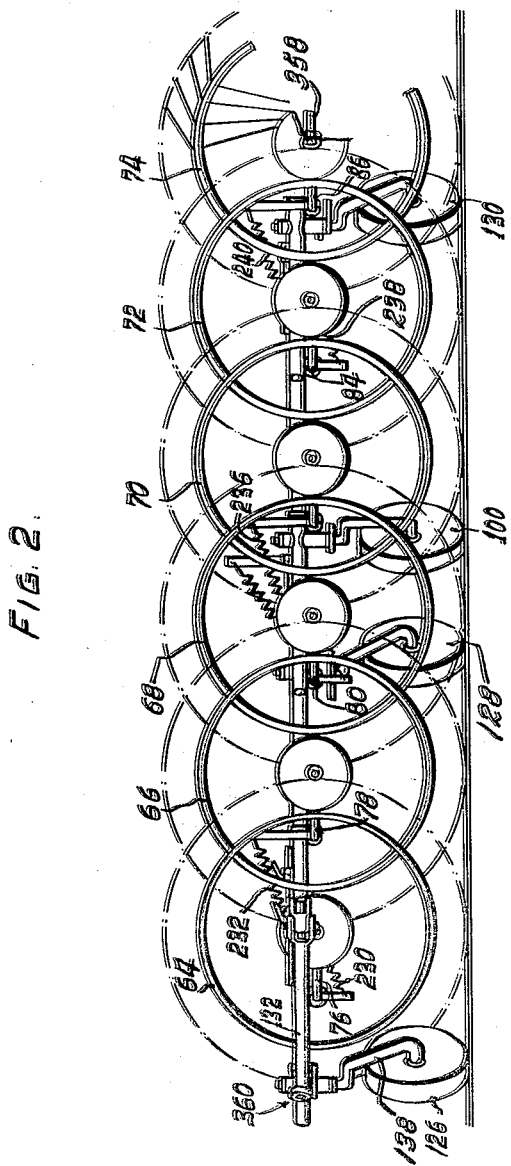

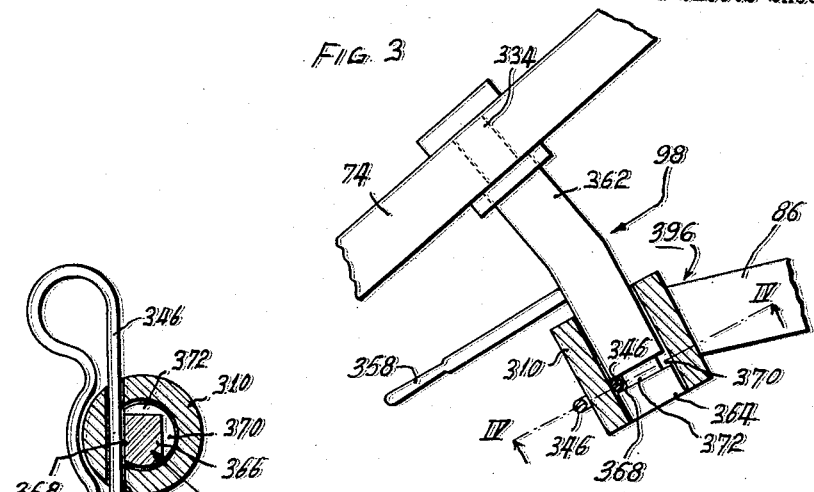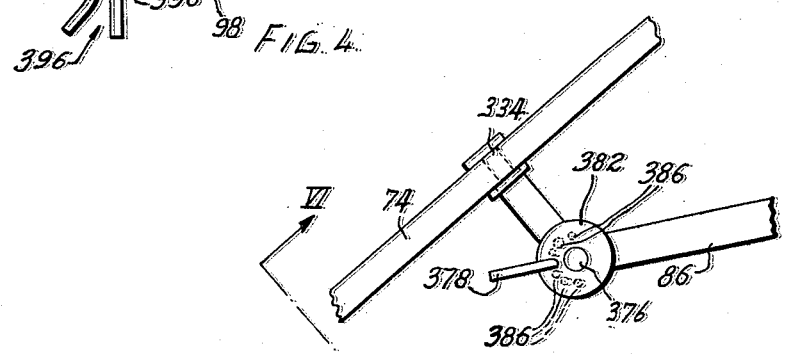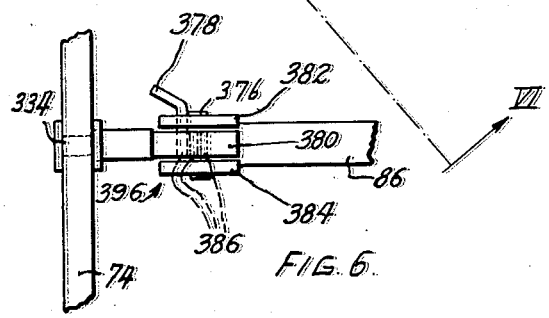

2,993,327
ROTARY RAKE WITH SPECIFIC RAKE WHEEL MOUNTING MEANS
Cornelis van der Lely and Ary van der Lely, Maasland, Netherlands, assignors to C. van der Lely N.V., Maasland, Netherlands, a Dutch limited company of the Netherlands
Filed Sept. 30, 1957, Ser. No. 686,944
Claims priority, application Netherlands Dec. 8, 1956
19 Claims. (Cl. 56—377)

This invention relates to devices for the lateral displacement of crop lying on the ground. This type of device may, for example, comprise a frame with a plurality of rake wheels, each of which is connected with the frame by means of a crank permitting movement in a vertical direction with respect to the frame during operation.

Known devices to which the present invention relates may often be used for two different methods of working the crop. However, in order to bring the device from one working position to the other, frequently drastic modifications of the frame are required, which involves many manipulations and adjustments. In the known devices, the rake wheels are connected to the frame by means of cranks so that the rake wheels are movable in a vertical direction. To insure a satisfactory adaptation and accommodation of the wheels to the unevennesses of the field, it is necessary for the rake wheels and the cranks to be detached from the device and re-arranged at different locations relative to the frame in order to bring the device from one working position to the other. Since the cranks are usually provided with springs to transmit at least part of the weight of the rake wheels to the frame, the changing of the rake wheels with their cranks is a time consuming task.

An object of this invention is to provide a device of the kind referred to, which can be readily and simply brought from one working position to the other.

Another object of the present invention is the provision of a rake wheel which can be fixed relative to the crank in at least two positions so that the wheel plane of the rake wheel in one is at an angle to the wheel plane in the other position.

Yet another object of the present invention is that the transition from one working position to another working position only requires the displacement of the rake wheels relative to the cranks, to different positions, in order to avoid the loss of time involved in the removal of the cranks with their springs.

In the present invention, a simple adjustment of each rake wheel relative to its associated crank is provided. This adjustment is obtained by connecting the rake wheel with its associated crank by means of an angularly adjustable shaft which is inclined to the axle of the rake wheel about which the rake wheel rotates. With this construction, the change of the position of the rake wheel relative to its associated crank requires only an angular movement of the rake wheel about the adjustable shaft, so that it no longer becomes necessary to detach the rake wheel from its associated crank. It is only necessary to be able to lock the adjustable shaft in its different positions relative to the crank.

There is also provided an advantageous locking device, which requires little time for locking and unlocking it. The locking device includes a resilient locking pin for locking the adjustable shaft in any of a plurality of positions relative to the crank. In order to facilitate turning of the adjustable shaft relative to the crank, it is advantageous to fasten a handle to the shaft with the aid of which the shaft can be moved from one position to the other relative to the crank.

According to a further aspect of the invention, a simple and cheap construction may be obtained by arranging the adjustable shaft and the axle of the rake wheel in one plane, so that the shaft and the axle may be formed from one rod, which is bent only to a small extent.

For a better understanding of the invention, and to show how the same may be carried into effect, reference will now be made to the accompanying drawings, in which:

FIG. 1 is a plan view of a device according to the invention;

FIG. 2 is a side view of the device shown in FIG. 1;

FIG. 3 is an enlarged plan view of a portion of the device with parts broken away and shown in section in the direction of arrows III—III of FIGURE 1, illustrating the manner in which one rake wheel with the tines omitted is coupled to its associated crank;

FIG. 4 is a sectional view taken on the line IV—IV of FIG. 3;

FIG. 5 is a plan view with the tines omitted of a modified detail of the device; and FIG. 6 is a view with the tines omitted as seen looking in the direction of the arrows VI—VI of FIG. 5.

The frame 12 of the device 10 comprises two frame portions 14 and 16, which are linked to one another by a horizontal axle or pivotal pin 18. The frame portion 14 is provided with support members 28 and 30 and the frame portion 16 has a support member 56, the support members 28 and 30 being connected with the frame portion 14 by means of vertical pivotal pins 32 and 34, whilst the support member 56 is connected by means of a vertical pivotal pin 62 with the frame portion 16. Rake wheels 64, 66, 68, 70, 72 and 74 are carried on the support members 28, 30 and 56, by means of cranks 76, 78, 80, 82, 84 and 86, respectively. By virtue of the manner in which the rake wheels are connected to the support members, they are movable in a vertical direction relative to the supports and hence can readily adapt themselves to the unevennesses of a field. In order to transfer at least part of the weight of the rake wheels with their cranks to the supports, the cranks are provided with springs or draw-springs 230, 232, 234, 236, 238 and 240, of which one end is connected with an appropriate support and the other end with a part of its associated crank which lies above or below the pivotal axis of the crank.

The cranks 76, 78, 80, 82, 84 and 86 are provided with bearings 300, 302, 304, 306, 308 and 310, which extend parallel to the pivotal axes of the cranks defined by bushings 312, 314, 316, 318, 320 and 322.

Each adjustable shaft 88, 90, 92, 94, 96 and 98 has an axis along its length which is parallel to the pivotal axis through its associated bushings about which the associated crank may turn. The stub axles 324, 326, 328, 330, 332 and 334 on which the rake wheels 64, 66, 68, 70, 72 and 74 respectively turn, are integral with an angularly adjustable shafts 88, 90, 92, 94, 96 and 98, which are journalled in the bearings 300, 302, 304, 306, 308 and 310 of the cranks 76, 78, 80, 82, 84 and 86. The shafts 88, 90, 92, 94, 96 and 98 are locked, during operation, against angular movement in the bearings 300, 302, 304, 306 and 308, 310 by means of locking devices 386, 388, 390, 392, 394 and 396, each respectively comprising resilient locking pins 336, 338, 340, 342, 344 and 346 (see also FIGURES 3 and 4 which illustrate rake wheel 74 and some of its associated parts in enlarged detail). In order to permit angular adustment of the shafts 88, 90, 92, 94, 96 and 98 in their bearings 300, 302, 304, 306, 308 and 310 after withdrawal of the locking pins 336, 338, 340, 342, 344 and 346, the shafts are provided with handles 348, 350, 352, 354, 356 and 358. The longitudinal axis of each stub axle 324, 326, 328, 330, 332 and 334 defines the respective axis about which rake wheels 64, 66, 68, 70, 72 and 74 rotate. Each last-mentioned axis and the center line or axis of each shaft are coplanar.

The frame 12 of the device 10 is supported on the ground by running wheels 100, 126, 128 and 130 which are turnable about vertical axes relative to the frame 12. In the position shown, the running wheels 100 and 128 are locked against rotation about their vertical axes relative to the frame, so that they determine the direction of travel and are capable of resisting lateral forces exerted on the frame 12. A drawbar 132 for the device is connected by a coupling 360 at the location of the vertical axis defined by the leg of support member 138 and hence the wheel 126 constitutes a control wheel. The vertical axis of running wheel 130 does not intersect the horizontal axis of rotation of the running wheel 130 and is not locked against rotation about the vertical axis, in the position shown, so that this wheel constitutes a caster wheel.

In the position of the rake wheels 64, 66, 68, 70, 72 and 74 indicated in FIGURE 1 by full lines, the device constitutes a side delivery rake, which is towed in the direction of the arrow I by any well known conventional tractor. The rake wheels will thus deliver the crop they encounter to the left.

The device may be converted into a tedder. Shaft 98 comprises three portions, two portions 362 and 364 of approximately the same diameter with a third portion 366 of reduced diameter. The two portions 362 and 364 together with surface of portion 366 define two or more keyways or grooves 368, 370 and 372, three keyways or grooves being shown, although it is to be understood that only two may be provided. Here, the discussion will be limited to the embodiment of rake wheel 74 and shaft 98, although it is to be understood that each shaft is provided with the two or more keyways or grooves in their associated parts. Bearing 310 is provided with an aperture 398 for receiving resilient locking pin 346 for engagement with the reduced portion 366 of shaft 98. To convert to a tedder first the locking pins 336, 338, 340, 342, 344 and 346, which are introduced into grooves, for example 368 (see FIGS. 3 and 4), to prevent the adjustable shafts, in this case shaft 98 from turning, must be removed, after which the adjustable shafts 88, 90, 92, 94, 96 and 98 can be turned through an angle of 180° about their own axes by means of the handles 348, 350, 352, 354, 356 and 358. Thereafter the locking pins 336, 338, 340, 342 and 344 are re-introduced into their keyways or grooves (for example 370 in the adjustable shaft 98), and the adjustable shafts are thus locked against rotation. As a consequence of this change, the rake wheels 64, 66, 68, 70, 72 and 74 will occupy the positions indicated in FIGURE 1 in broken lines, these positions being symmetrical about the vertical planes including the axes of the respective shafts 88, 90, 92, 94, 96 and 98. In this working position the device is towed in the direction of the arrow II by means of draw-bar 132 which has now been shifted to the position shown by the broken lines.

An advantage of the construction shown, in which the adjustable shafts are located at the ends of the cranks is that, when changing over the rake wheels, the tension in the draw-springs 230, 232, 234, 236, 238 and 240 need not be altered. In order to permit towing of the device 10 in this new direction of travel, in the direction of II, the draw-bar 132 can be released in a simple manner from the coupling 360, and can be brought to a different location on the frame 12 where there is a further coupling 374. When the device is towed in the direction of the arrow II, each rake wheel will engage a separate strip of the crop lying on the ground, the crop being thus left behind in small swaths. The conversion to this second working position requires adaptation of the running or ground wheels to the new direction of travel, the running wheel 100 remaining, in the new working position, as a caster wheel, whereas the running wheel 130 in this position is locked against rotation about its vertical pivotal axis by means of a locking device (not shown) similar to locking device 150 for wheel 128. In this new working position lateral forces are resisted by the running wheels 128 and 130, which determine at the same time the direction of movement.

It is also possible to attain a position differing from the aforesaid working positions by turning the adjustable shafts 88, 90, 92, 94, 96 and 98 through an angle which is smaller than 180°, for example through an angle of 90°, the shafts being locked by introducing the locking pins 336, 338, 340, 342, 344 and 346 into the grooves (for example 372). Thus a working position may be obtained, in which a rake wheel, rake wheel 74 as shown in FIGURES 3 and 4, occupies a canted position with respect to the vertical, and in which it is still set in rotation during operation by its contact with the ground. This position may be advantageous for working particular kinds of crop. If the angle between the stub axle 334, for example of the rake wheel 74 and the adjustable shaft 98 is not too small, the rake wheel 74 may be released from the ground by turning the adjustable shaft through a given angle; this position may be useful as a transport position. It will be evident that the other rake wheels may be similarly adjusted.

According to FIGURES 5 and 6 a rake wheel, for example 74, is connected with a crank 86 by means of a vertical pivotal shaft 376, a locking device locking pin 378 serving for locking the rake wheel against rotation about the pivotal shaft 376. By providing at least two or a plurality of holes 386 in an annulus 380, connected with the stub axle 334 of the rake wheel 74 and located between the cheeks or bushings 382 and 384 connected with the crank 86, the rake wheel 74 may be fixed in a plurality of positions relative to the crank.

While there has been described what is at present considered to be the preferred embodiment of this invention, it will be obvious to those skilled in the art that various changes and modifications may be made therein without departing from the scope of the invention.

What we claim is:

1. A device for the lateral displacement of crop lying on the ground, comprising a frame, a crank coupled to said frame, a rake wheel, and means coupling the rake wheel to said crank so that the rake wheel can be fixed in at least two positions relative to the crank, the wheel in one position defining a plane which is at an angle with respect to the plane of the wheel in the other position.

2. A device as claimed in claim 1, wherein said means comprises an angularly adjustable shaft, and wherein said rake wheel is connected with said crank by means of said angularly adjustable shaft, said shaft being inclined to the axis of rotation of the rake wheel.

3. A device as claimed in claim 2, comprising a bushing on said frame, said crank being operatively associated with said bushing and turning about an axis which passes through said bushing, said shaft being parallel to the said axis about which the said crank may turn.

4. A device as claimed in claim 2, comprising a locking device, said locking device including a resilient pin, said shaft being provided with openings, and means cooperating with said resilient pin and said shaft for locking said shaft to said crank in a plurality of positions.

5. A device as claimed in claim 4 including a handle secured to said adjustable shaft, so that said shaft can be moved from one position to the other relative to the crank.

6. A device as claimed in claim 1, wherein said means includes a stub axle, said rake wheel being positioned on said stub axle for rotation about the longitudinal axis thereof, the center line of said axle and said longitudinal axis being coplanar.

7. A device as claimed in claim 1, including a support member, means rotatably coupling said support member to said frame, a spring coupled between said crank and said support so that at least part of the weight of said crank and of said rake wheel is transferred in a resilient manner to said frame.

8. In a device for the displacement of crop lying on the ground, the combination with a frame and draw-bar for drawing said frame along the ground, comprising a crank, a rake wheel coupled to said crank, means operatively associated with and coupling said crank to said frame, and a shaft coupling said rake wheel to said crank, said shaft being adjustable so as to change the position of said rake wheel relative to said frame whereby to move said rake wheel from a first working position to a second working position.

9. A device operatively associated with and according to claim 8, including a locking device locking said shaft to said crank in at least two working positions.

10. A device according to claim 9, wherein said locking device comprises a bearing coupled to one end of said crank, said bearing including an aperture, and a resilient locking pin insertable within said aperture for engagement with said shaft whereby to lock said shaft in one of said working positions.

11. A device according to claim 10, wherein said shaft comprises three portions, two of said portions being of substantially the same diameter, said third portion of said shaft being of a reduced diameter which is less than the diameter of said two portions, said locking pin when inserted into said aperture in said bushing engaging said third portion of said shaft whereby to prevent rotation thereof relative to said crank.

12. A device according to claim 11, wherein said third portion of said shaft defines a first groove and a second groove angularly displaced from said first groove by 180°, said locking pin being engageable with said first groove to lock said shaft in said first working position, and means for rotating said shaft through an angle of 180° whereby to bring said second groove into alignment with said aperture in said bushing such that when said resilient locking pin is inserted into said aperture it engages said second groove thereby locking said shaft to said crank in said second working position.

13. A device according to claim 11, wherein said third portion of said shaft defines three angularly displaced grooves, said locking pin being engageable with the first or one of said grooves to lock said shaft in said first working position and engageable with the second or another of said grooves to lock said shaft in said second working position, and said locking pin being engageable with said third groove for locking said shaft in a third working position.

14. A device according to claim 13, wherein said first groove is angularly displaced substantially 180° from said second groove, and said third groove being angularly displaced substantially 90° from said first and second grooves, whereby to lock said shaft in three different working positions each displaced angularly substantially 90° from another.

15. A device according to claim 9, wherein said shaft is pivotally connected to said crank, and said locking device locks said crank relative to said shaft whereby to prevent the pivoting thereof.

16. A device according to claim 15, wherein said locking device comprises a resilient locking pin, said shaft being provided with an annulus having at least two holes therein for the reception of said locking pin, said shaft and annulus being positionable in a first position whereby said locking pin engages one of said holes for locking said shaft in a first working position, and said locking pin being engageable with another of said holes for locking said shaft in a second working position.

17. A device according to claim 16, including first and second bushings, said crank being positioned between said bushings, a vertical pivotal shaft placed between said bushings, said first-mentioned shaft being pivotally connected to said vertical pivotal shaft for pivotal movement relative to said crank, one of said bushings being provided with said resilient locking pin for locking said first-mentioned shaft to said crank.

18. A device according to claim 8, comprising at least two support members coupled to said frame, the first said crank and a second crank being coupled to one of said support members and third and fourth cranks coupled to the other of said support members, shafts including the first said shaft coupled to each of said cranks, rake wheels including the first said rake wheel coupled to each of said shafts, and a locking device coupling each of said shafts to its associated crank, said locking device being effective for locking its associated shaft in at least two working positions, whereby each of said rake wheels may be locked in each of said working positions without detaching said rake wheel from its associated shaft.

19. A device according to claim 18, comprising a plurality of springs, one spring being provided for each crank, each of said springs having one end connected to said associated crank and said other end connected to said support member whereby to transfer part of the weight of said rake wheels and said cranks to said associated support member.

References Cited in the file of this patent

UNITED STATES PATENTS

| | | |
|---|---|---|
| 2,819,578 | Wuster | Jan. 14, 1958 |

FOREIGN PATENTS

| | | |
|---|---|---|
| 512,929 | Belgium | Aug. 14, 1952 |
| 1,081,746 | France | June 9, 1954 |
| 162,242 | Australia | Mar. 29, 1955 |